(12) United States Patent
Shinada et al.

(10) Patent No.: US 7,171,026 B2
(45) Date of Patent: Jan. 30, 2007

(54) STEERING DEVICE, METHOD OF AUTHENTICATING A DRIVER, AND VEHICLE

(75) Inventors: Akira Shinada, Tokyo (JP); Kiyoaki Takiguchi, Kanagawa (JP); Koichi Maeyama, Kanagawa (JP)

(73) Assignee: Sony Corporation (JP)

( * ) Notice: Subject to any disclaimer, the term of this patent is extended or adjusted under 35 U.S.C. 154(b) by 780 days.

(21) Appl. No.: 10/283,139

(22) Filed: Oct. 30, 2002

(65) Prior Publication Data

US 2003/0086588 A1 May 8, 2003

(30) Foreign Application Priority Data

Nov. 2, 2001 (JP) ............................ P2001-337895

(51) Int. Cl.
*G06K 9/00* (2006.01)
(52) U.S. Cl. ..................... 382/104; 382/168; 280/774
(58) Field of Classification Search ................ 382/103, 382/104, 106, 107, 115, 116, 123, 128, 154, 382/168, 169, 209, 274, 285, 291–296, 305; 315/291, 312, 185; 280/735, 774; 356/71; 600/475
See application file for complete search history.

(56) References Cited

U.S. PATENT DOCUMENTS

| | | | |
|---|---|---|---|
| 4,699,149 A * | 10/1987 | Rice ............................ | 600/475 |
| 6,340,868 B1 * | 1/2002 | Lys et al. ................. | 315/185 S |
| 6,528,954 B1 * | 3/2003 | Lys et al. .................... | 315/291 |
| 6,560,352 B2 * | 5/2003 | Rowe et al. ................. | 382/115 |
| 6,720,745 B2 * | 4/2004 | Lys et al. .................... | 315/312 |
| 6,898,299 B1 * | 5/2005 | Brooks ........................ | 282/115 |
| 6,912,045 B2 * | 6/2005 | Kono et al. ................... | 356/71 |
| 6,942,248 B2 * | 9/2005 | Breed et al. ................. | 280/735 |

OTHER PUBLICATIONS

Sensor Review vol. 12 No. 3, 1992, pp. 19-23, © MCB University Press, 0260-2288 "Veincheck Lends A Hand For High Security" by Paul MacGregor and Robert Welford.

* cited by examiner

*Primary Examiner*—Matthew C. Bella
*Assistant Examiner*—Seyed Azarian
(74) *Attorney, Agent, or Firm*—Rader Fishman & Grauer PLLC; Ronald P. Kananen

(57) ABSTRACT

A steering device, a method for authenticating a driver, and a vehicle are disclosed. The steering device is equipped with an identification information acquisition unit. When a driver takes a position for operating the steering device, namely, a home position to the steering device, the identification information acquisition unit acquires a venous pattern of the driver as identification information. The steering device then outputs the identification information.

10 Claims, 13 Drawing Sheets

STEERING DEVICE, METHOD OF AUTHENTICATING A DRIVER, AND VEHICLE

BACKGROUND OF THE INVENTION

1. Field of the Invention

The present invention relates to a steering device, a method of authenticating a driver, and a vehicle for individually identifying and authenticating the driver of a vehicle like a car.

2. Description of the Related Art

Keyless entry devices are now in widespread use. In the keyless entry device, a remote unit exchanges data with a vehicle using radiowaves and then locks or unlocks a door of the vehicle in response to the exchanged data. Such a keyless entry device prevents thefts. As with conventional keys, a driver is unable to use the vehicle if the driver loses the keyless entry device. The keyless entry device is not free from the problem that a third party who may have illegally obtained the keyless entry device may use the vehicle.

Authentication based on the keyless entry devices or keys permits a holder of the keyless entry devices or keys to use the vehicle. Information of whether or not the holder of the keys or the like is a legal user of the vehicle is not conveyed to the vehicle.

Devices for utilizing drivers' biological information such as fingerprints, as personal identification means are now being developed to assure the security of a vehicle. For example, a driver touches an authentication device installed on a door of the vehicle with one of his or her fingers, and the device detects the fingerprint, and cross-checks the input fingerprint with a registered fingerprint for matching. Only when both fingerprints match each other, the driver is successfully authenticated, and the door is openable.

Since one among tens of thousands of individuals may have the same fingerprint, the fingerprint is an excellent means for authentication. The use of fingerprints commands attention not only in the security field but also in other fields.

A driver must perform a particular action, such as pressing his or her finger on a detector of an authentication device, for individual authentication in a conventional authentication device. The ease of use is not sufficiently attained.

Other candidates for authentication include a voice print, an iris, a vessel pattern of a drum membrane, etc. These are extremely fine in pattern. To achieve a high authentication accuracy, the pattern must be detected with a high resolution. A pattern detector in the authentication device becomes costly, leading to a high cost for the whole system.

A new authentication method has been proposed which detects a venous pattern of the back of one hand of a user (a pattern of veins which looks pale through the skin of the hand of the user) (MacGregor, P, Welford R, "Veincheck Lends A Hand For High Security", E0968 Sensor Review, vol. 12, No. 3, 1992, pages 19–23, EN). The venous pattern is more coarse than the patterns of the fingerprint and the iris. The authentication device detects the venous pattern with a substantially low resolution. Even when the venous pattern of the back of the hand is used, the user must perform a particular action such as placing the back of the hand to cause the back of the hand to face the detector of the authentication device. The user friendliness of the device is not sufficient.

SUMMARY OF THE INVENTION

Accordingly, it is an object of the present invention to provide a steering device, which is low in cost and user friendly, a method of authenticating a driver, and a vehicle.

According to one aspect of the present invention, a steering device operated by a driver when the driver drives a vehicle includes an identification information acquisition unit, which acquires identification information of the driver when the driver takes a position for operating the steering device and an identification information output unit for outputting the identification information.

The steering device of the present invention acquires identification information of the driver through the identification information acquisition unit when the driver takes a natural driving position, namely, a home position for operating the steering device, and outputs the identification information through the identification information output unit. The steering device is typically a steering wheel. In the present invention, the steering device also includes a joy stick type, which is being widely developed. Taking the home position corresponds to holding of a steering wheel or holding a grip portion of a joy stick, for example. In accordance with the present invention, the identification information of the driver is acquired when the driver takes the home position to the steering device. The driver does not need to perform any particular action in authentication.

The identification information acquisition unit detects the blood vessel running pattern of the driver and acquires the blood vessel running pattern as the identification information. To detect the blood vessel running pattern, several methods are used. In one method, a magnetic field is generated and the flow of blood within the magnetic field is detected. In another method, an ultrasonic beam is used to detect the blood vessel running pattern. In yet another method, an infrared emitter emits an infrared light beam and an infrared light detector detects a blood vessel running pattern of the driver in the reflected light. The blood vessel running pattern is a venous pattern, for example. The artery and vein are different in their content of oxygen, and they are thus different in their absorptivity to infrared light. The venous pattern is thus detected. The identification information acquisition unit is installed at a location where the wrist or the palm of the hand of the driver faces during the steering operation of the driver, namely, at a location which takes into consideration the action of the driver.

The identification information acquisition unit in the steering device of the present invention detects the blood vessel running pattern using an infrared light beam. The identification information is thus acquired not only when the driver is in contact with the unit but also when the driver is in non-contact with the unit. Even if no portion of the body of the driver is in contact with the identification information acquisition unit, the identification information is acquired as long as the driver is in close proximity with the unit. It is not required that a portion of the body of the driver be in contact with the identification information acquisition unit. For example, the driver does not need to press the palm of his or her hand against the unit.

The identification information output unit may output the detected blood vessel running pattern in whole or in part as the identification information to be processed in an external unit for authentication. The steering device itself may authenticate the driver in response to the detected blood vessel running pattern and may output the authentication result.

In accordance with the driver authentication method of the present invention, the blood vessel running pattern of the driver is acquired as the identification information, and authentication is performed based on the identification information. Specifically, the infrared light beam is directed to a predetermined portion of the body of the driver when the driver operates the operation unit. The blood vessel running pattern is acquired from the reflected infrared light beam as the identification information. Authentication is performed based on the identification information. The operation unit of the vehicle may be a steering wheel or a shift lever. A door of the vehicle may be used as an operation unit of the vehicle.

According to another aspect of the present invention, a method of authenticating a driver includes the steps of acquiring, as identification information of the driver, the running pattern blood vessels of the driver based on infrared light that is reflected from a predetermined portion of the body of the driver when an infrared light beam is directed to the predetermined portion of the body of the driver who operates an operation device of a vehicle and authenticating the driver based on the identification information.

In accordance with the driver authentication method of the present invention, a particular process may be performed on a per driver basis in response to the result of the authentication. For example, control parameters of the vehicle may be uniquely modified for an individual driver. The control parameters of the vehicle of the driver may include the spring constant of a suspension device, the damping characteristics of a damper, timings of shiftup and shiftdown in an automatic transmission, the height and position of the seat, etc. Particular processes may further include prohibiting an access to an engine control system, and stopping an engine depending on the result of authentication.

According to yet another aspect of the present invention, a vehicle includes an operation unit which receives an operation input by a driver, an identification information acquisition unit that is mounted on the operation means and acquires, as identification information of the driver, the running pattern of blood vessels of the driver based on light that is reflected from a predetermined portion of the body of the driver when an infrared light beam is directed to the predetermined portion of the body of the driver, and an authenticating unit for authenticating the driver based on the identification information.

The vehicle of the present invention acquires the blood vessel running pattern of the driver as the identification information and authenticates the driver based on the result of authentication performed in accordance with the identification information. Specifically, the identification information acquisition unit is mounted on the operation unit, which responds to the operation input by the driver. The identification information acquisition unit acquires, as identification information of the driver, the blood vessel running pattern of the driver based on light that is reflected when an infrared light beam is directed to the predetermined portion of the body of the driver. The authenticating unit authenticates the driver based on the identification information acquired by the identification information acquisition unit. The operation unit, which responds to the operation input by the driver, may be a steering wheel, a shift lever, or a door of the vehicle.

The vehicle of the present invention may further include a processor unit, which performs a particular process for a respective driver based on the authentication result of the authenticating unit. The particular process may include the restraint to the access to the engine control system, the setting of the height and position of the seat, and the setting of a mirror.

A joy stick may be used for a steering device for converting an operational amount into an electrical signal. The steering device may includes a fixed unit mounted close to the position of operation and a movable unit that is shaped to receive the palm of the hand of the driver for gripping and is movably attached to the fixed unit so that the displacement of the movable unit is the operational amount.

DESCRIPTION OF THE PREFERRED EMBODIMENTS

The embodiments of the present invention are discussed below with reference to the drawings.

One embodiment of the present invention relates to an authentication system which authenticates a venous pattern (a blood vessel running pattern) of a driver and restricts the access to an engine control system of a car.

Figure 1:
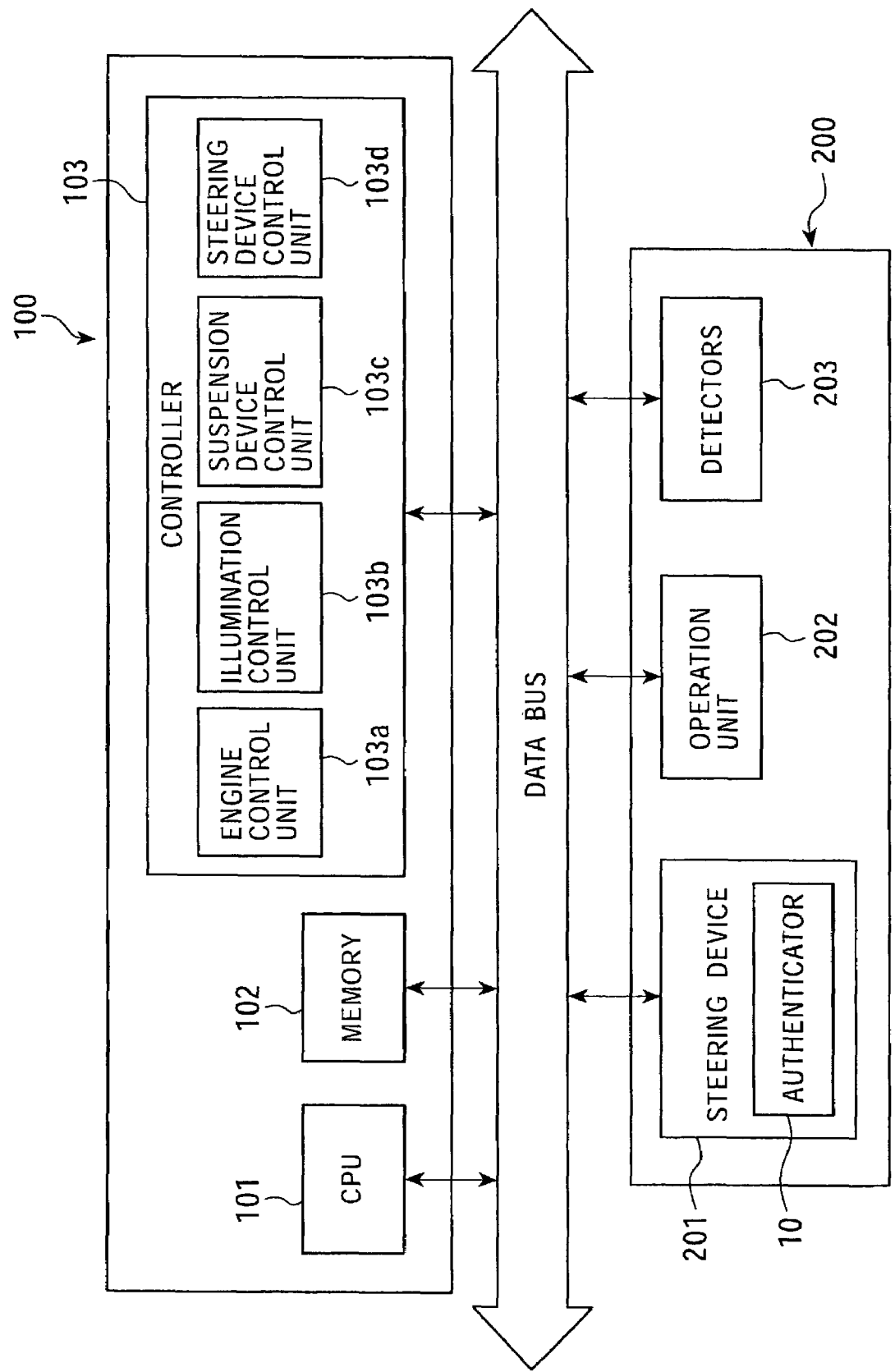
FIG. 1 is a block diagram illustrating the general construction of a car in accordance with one embodiment of the present invention.

FIG. 1 is a block diagram illustrating the general construction of a vehicle in accordance with one embodiment of the present invention.

The vehicle illustrated in FIG. 1 includes a control block 100 for controlling the vehicle and an interface block 200 that receives a predetermined input from a driver. The control block 100 and the interface block 200 are interconnected through a data bus.

The control block 100 includes a CPU 101 for controlling the general system of the vehicle and performing calculations, a memory 102 working as an internal memory such as a DRAM (Dynamic Random Access Memory), and a controller (processor means) 103 for controlling the vehicle. For example, as shown in FIG. 1, the controller 103 includes an engine control unit 103a for controlling the start and operation of an engine, an illumination control unit 103b for controlling the illumination of an interior light and headlight, a suspension device control unit 103c for controlling the spring constant of a suspension device and the damping characteristics of a damper, and a steering device control unit 103d for controlling the unlocking of a steering device.

The interface block 200 includes a steering device (an operation device or operation means) 201, an operation unit 202 for controlling the acceleration and deceleration of the vehicle, and detectors 203, such as a speed meter or a distance meter. Typically, the steering device 201 is a steering wheel; and, the operation unit 202 includes a shift lever, an acceleration pedal, and a brake pedal.

Referring to FIG. 1, the controller 103 is directly connected to the data bus. Alternatively, the controller 103 may be connected to the data bus through an internal LAN.

Figure 2A:
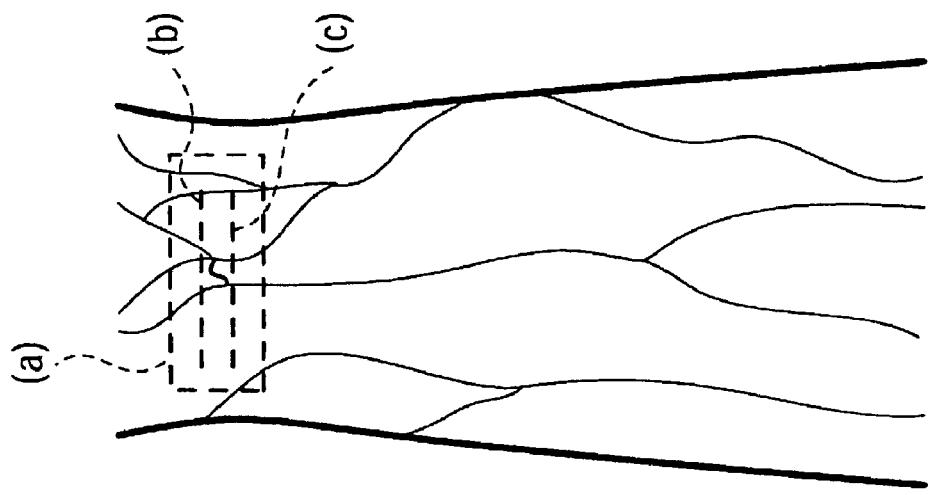
FIGS. 2A–2C illustrate venous patterns.

The vehicle of this embodiment includes an authenticator 10. The authenticator 10 authenticates a driver in accordance with the venous pattern of the driver. Referring to FIGS. 2A to 3, the practicality of the authentication of the driver using his or her venous pattern is discussed, followed by a discussion of the construction of the authenticator 10.

Figure 2B:
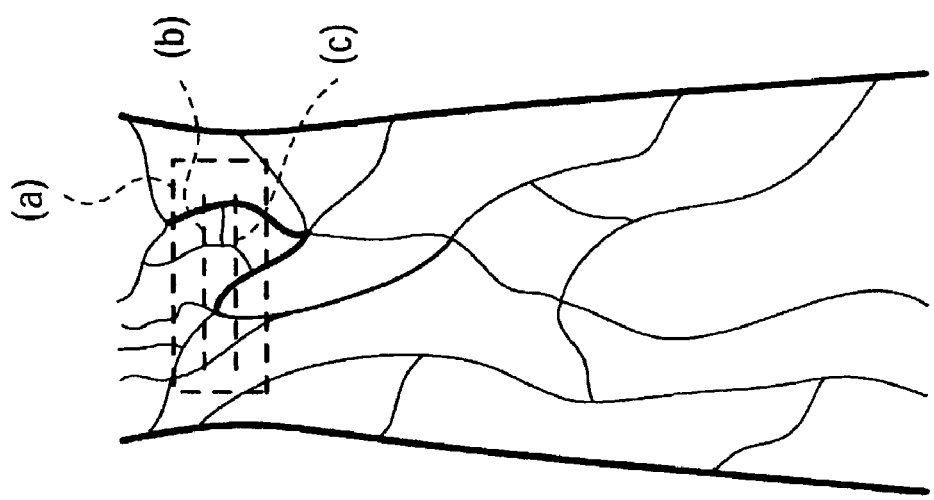
Figure 2C:
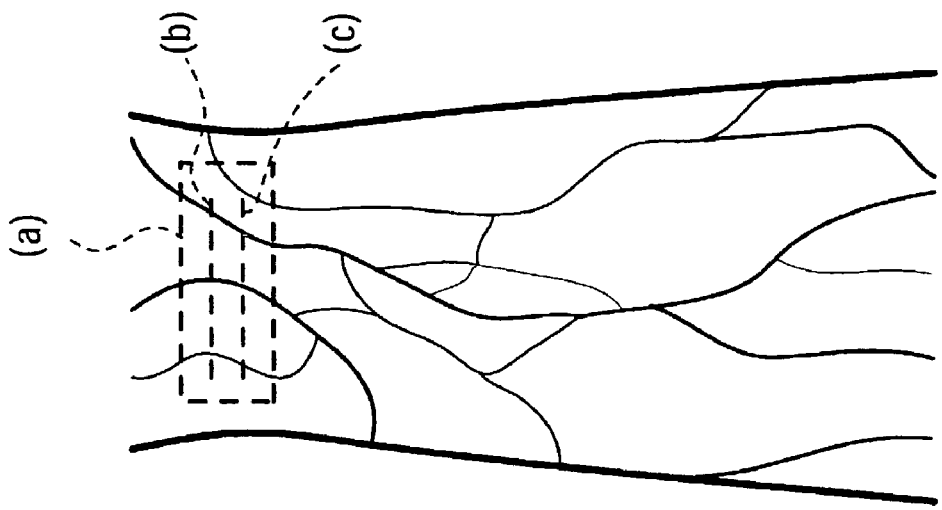
Figure 3:
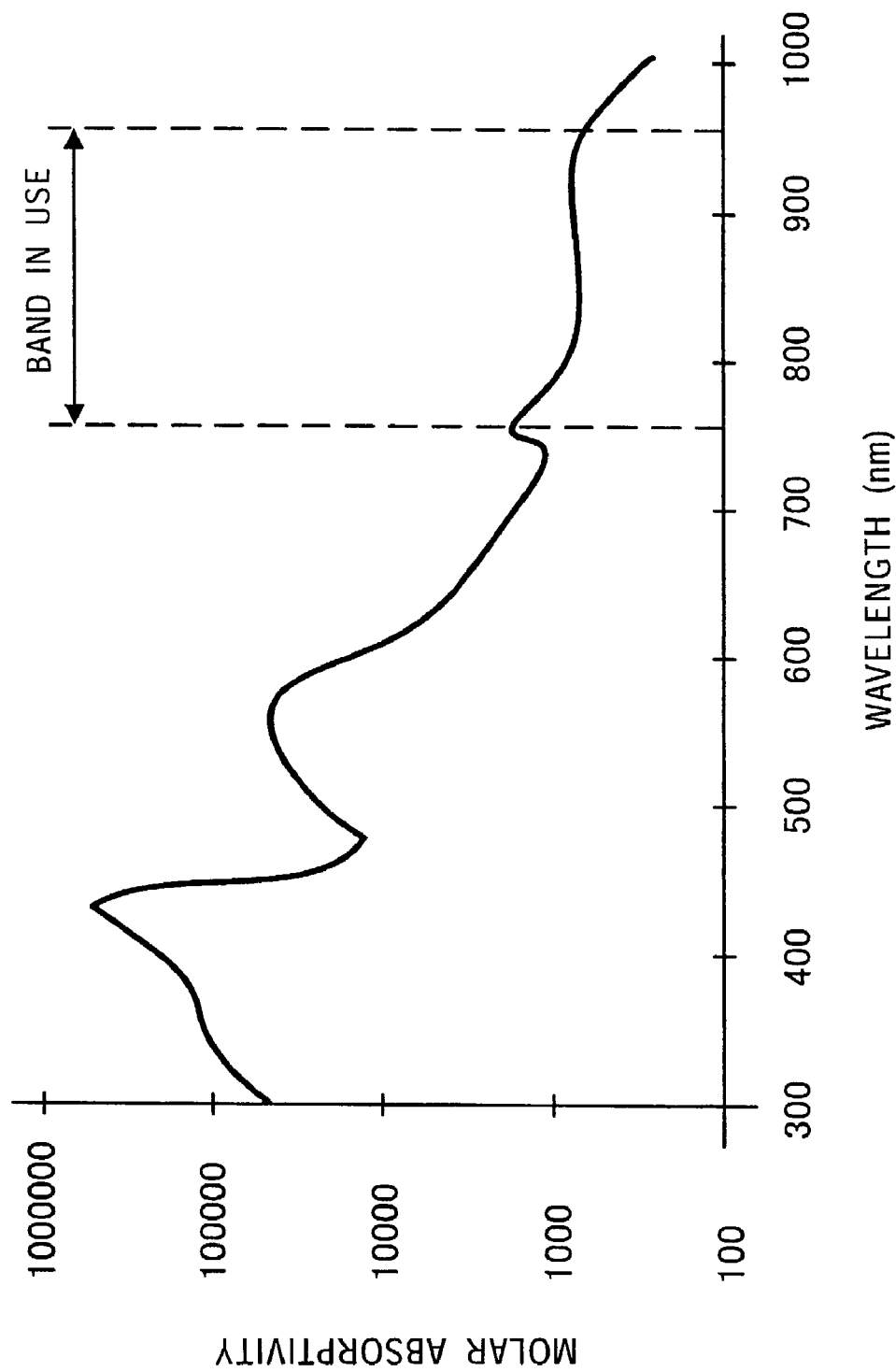
FIG. 3 illustrates a plot of an absorption spectrum of a venous blood pattern versus the band of near-infrared light used in the detection of the vein.

FIGS. 2A–2C illustrate venous patterns of the inside of the forearm (leading to the palm of the hand) of a human. As shown in FIGS. 2A–2C, the venous pattern is substantially different from one person to another. The fingerprint is present on a finger only, but the venous pattern is found in any portion of the human body. Practically, the venous pattern does not change with age. Like the venous pattern on the back of the hand already discussed in connection with the conventional art, the venous pattern on the inside of the forearm can be used for authentication.

As the venous pattern of the inside of the forearm (leading to the palm of the hand) is substantially different from one person to another, the venous pattern of the palm of the hand and the venous pattern on the finger tip are also different from one person to another. Not only the venous pattern in the inside of the forearm but also the venous pattern of the palm of the hand and the venous pattern on the finger tip may be used for authentication.

FIG. 3 illustrates a plot of an absorption spectrum of a venous blood pattern versus the band of near-infrared light used in the detection of the vein. As shown, the venous pattern is optically captured within a wavelength range of from 750 to 950 nm in this embodiment. There is no biological substance but hemoglobin which has a large absorption band within the wavelength range of from 750 to 950 nm. FIGS. 2A–2C illustrate the example of the venous patterns of the inside of the forearm (the side of the forearm leading to the palm of the hand) optically captured within the wavelength range of from 750 to 950 nm.

The construction of the authenticator 10 responsible for the detection of the venous pattern will be discussed with reference to FIG. 4.

Figure 4:
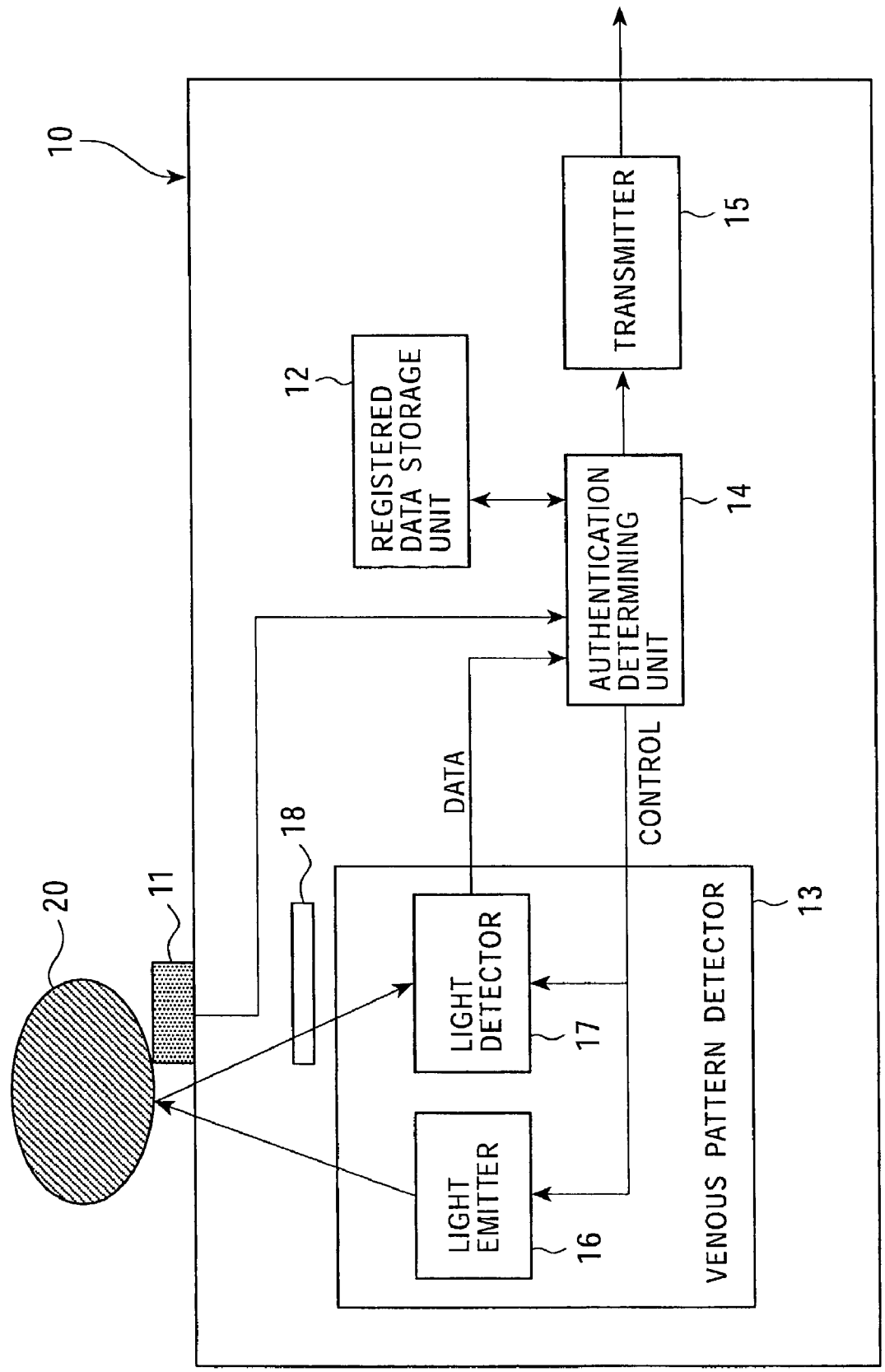
FIG. 4 is a block diagram of an authenticator.

Referring to FIG. 4, the authenticator 10 includes a sensor 11 that senses the proximity or touch of a driver 20 to the authenticator 10, a registered data storage unit 12 for storing a registered venous pattern, a venous pattern detector 13 (an identification information acquisition unit or identification information acquisition means) for detecting the venous pattern of the driver 20, an authentication determining unit 14 (authenticating means) for analyzing the venous pattern detected by the venous pattern detector 13 and for cross-checking the venous pattern detected by the venous pattern detector 13 with the registered venous pattern stored in the registered data storage unit 12 for authentication, and a transmitter 15 (an identification information output unit) for transmitting the result of authentication of the authentication determining unit 14. The sensor 11 may be a conventional proximity switch, such as a switch which uses a change in capacitance due to the proximity of a human to the authenticator 10, or a photoelectric switch which responds to reflected light.

The registered data storage unit 12 stores data of the venous pattern of a predetermined driver 20. To register the venous pattern data, the driver 20 places a predetermined portion of the body, for example, the wrist or the palm of the hand, to face the venous pattern detector 13 to detect the venous pattern of that portion as will be discussed in detail later, and perform a predetermined operation for registration. The detected data are stored in the registered data storage unit 12. By performing a predetermined operation, the data of the venous pattern of the driver 20 already stored in the registered data storage unit 12 may be deleted. The registration and the deletion of the venous pattern are carried out by operating a registering unit (not shown).

Figure 5:
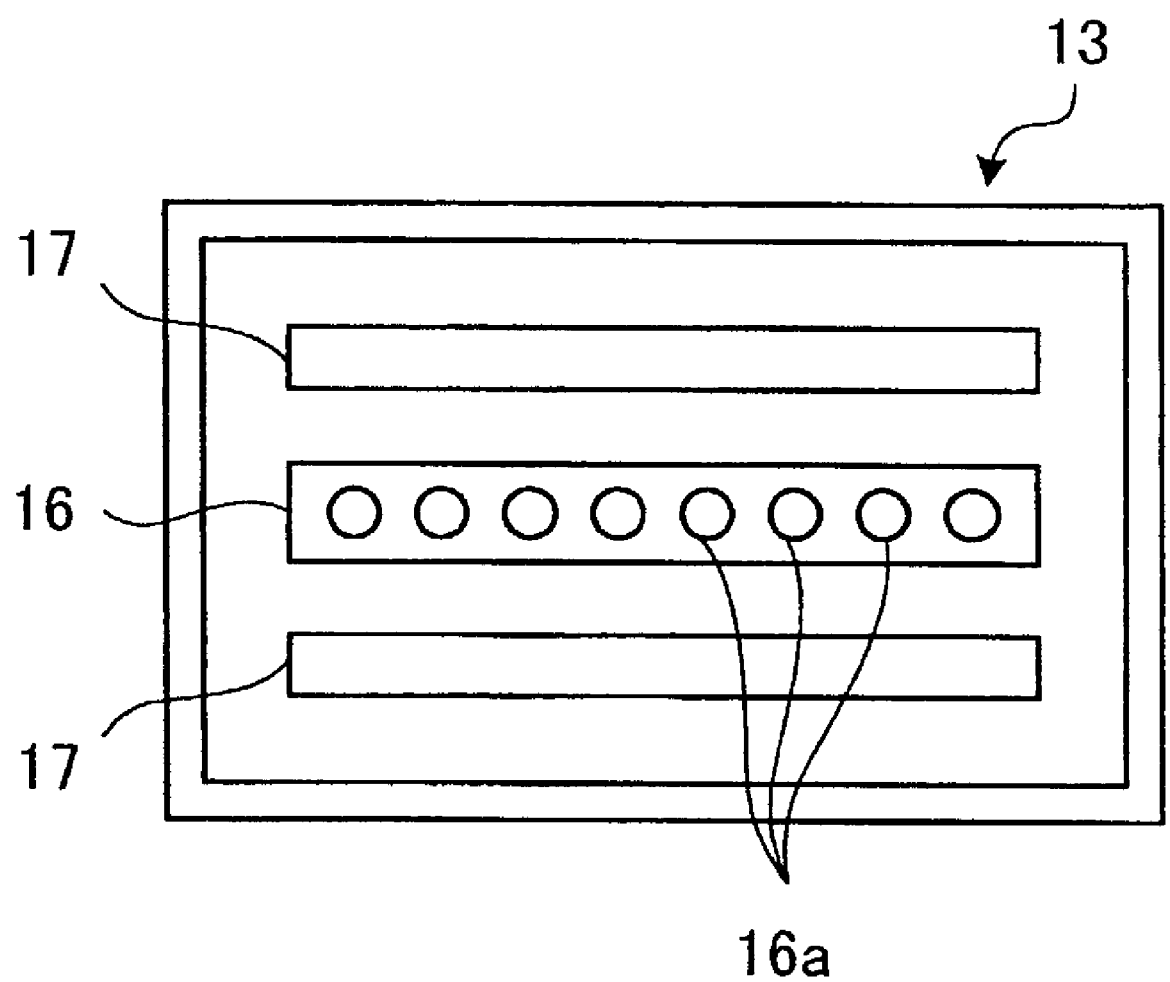
FIG. 5 illustrates the venous pattern detector.

The venous pattern detector 13 includes a light emitter 16 (an infrared emitter) for emitting an infrared light beam and a light detector 17, formed of a line sensor such as a one-dimensional CCD (Charge Coupled Device), for detecting light reflected from the surface of the skin of the driver 20 when the infrared light beam emitted from the light emitter 16 is directed to the skin of the driver 20. The infrared light beam emitted from the light emitter 16 is reflected from the surface of the skin of the driver 20. The reflected light then is transmitted through a filter 18 and is then picked up by the light detector 17. Referring to FIG. 5, the light emitter 16 is formed of a line of a plurality of lamps 16a. As shown, a pair of light detectors 17 are arranged on both sides of the light emitter 16.

The venous pattern detector 13 detects the venous pattern not only when the predetermined portion of the body of the driver 20 is in contact with the venous pattern detector 13 but also when the predetermined portion of the body of the driver 20 is in proximity with, namely, in non-contact with, the venous pattern detector 13. This is because the authentication of the venous pattern does not require so fine a ruggedness in detection as the fingerprint authentication does. In the venous pattern authentication, the venous pattern is captured as an image. The light detector 17 detects the venous pattern with a resolution lower than that used to detect the fine ruggedness of the fingerprint.

The authenticator 10 thus constructed is installed on an object that the driver 20 operates, for example, a steering wheel working as a steering device 201 of a car in this embodiment. Alternatively, the authenticator 10 may be installed on a shift lever working as the operation unit 202. As will be discussed later, the mounting position of the authenticator 10, namely, the venous pattern detector 13 on the object that is operated by the driver 20, is extremely important in this invention.

Figure 6:
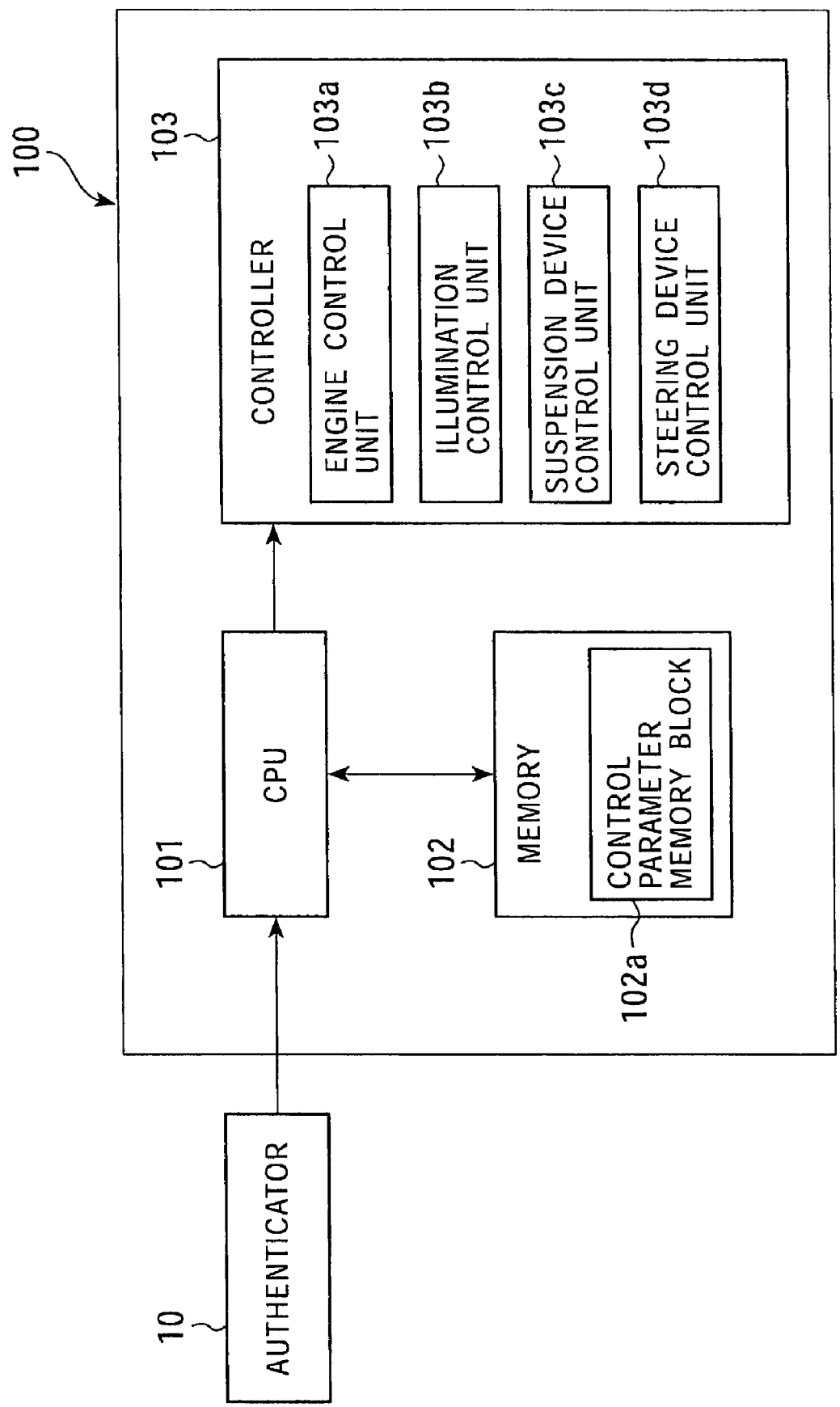
FIG. 6 illustrates the flow of an authentication process of the authenticator.

The authentication process of the authenticator 10 will now be discussed with reference to FIG. 6.

The authenticator 10 supplies the transmitter 15 with the result of authentication obtained in the authentication determining unit 14. In response, the transmitter 15 transmits the authentication result to the CPU 101 in the control block 100.

The memory 102 includes a control parameter memory block 102a for storing control parameters different from driver to driver. The control parameters of the vehicle of a driver include the spring constant of the suspension device, the damping characteristics of the damper, the timings of switching on and off the headlight if the vehicle is equipped with an automatic illumination control facility, the timings of shiftup and shiftdown in the automatic transmission, the height and position of the seat, the positions of mirrors, etc. The control parameters different from driver to driver are associationed with the venous pattern of the driver 20 stored in the registered data storage unit 12.

Upon receiving the authentication result from the transmitter 15, the CPU 101 reads a control parameter unique to the driver from the control parameter memory block 102a and then outputs the control parameter to the controller 103. In response to the control parameter unique to the driver, the engine control unit 103a, the illumination control unit 103b, the suspension device control unit 103c, and the steering device control unit 103d in the controller 103 control the vehicle.

The authenticator 10 thus constructed may be used in a joy stick (example 1) or in a conventional steering device (example 2).

EXAMPLE 1

As is known, the vehicle typically includes a steering wheel, a shift lever, an acceleration pedal, and a deceleration pedal near the driver's seat. In example 1, the authenticator 10 is applied in a joy stick 30 (corresponding to a steering device, an operation device, or operation means) as shown in FIG. 7.

The construction of the joy stick 30 is discussed below with reference to FIG. 7 through FIG. 10.

Figure 7:
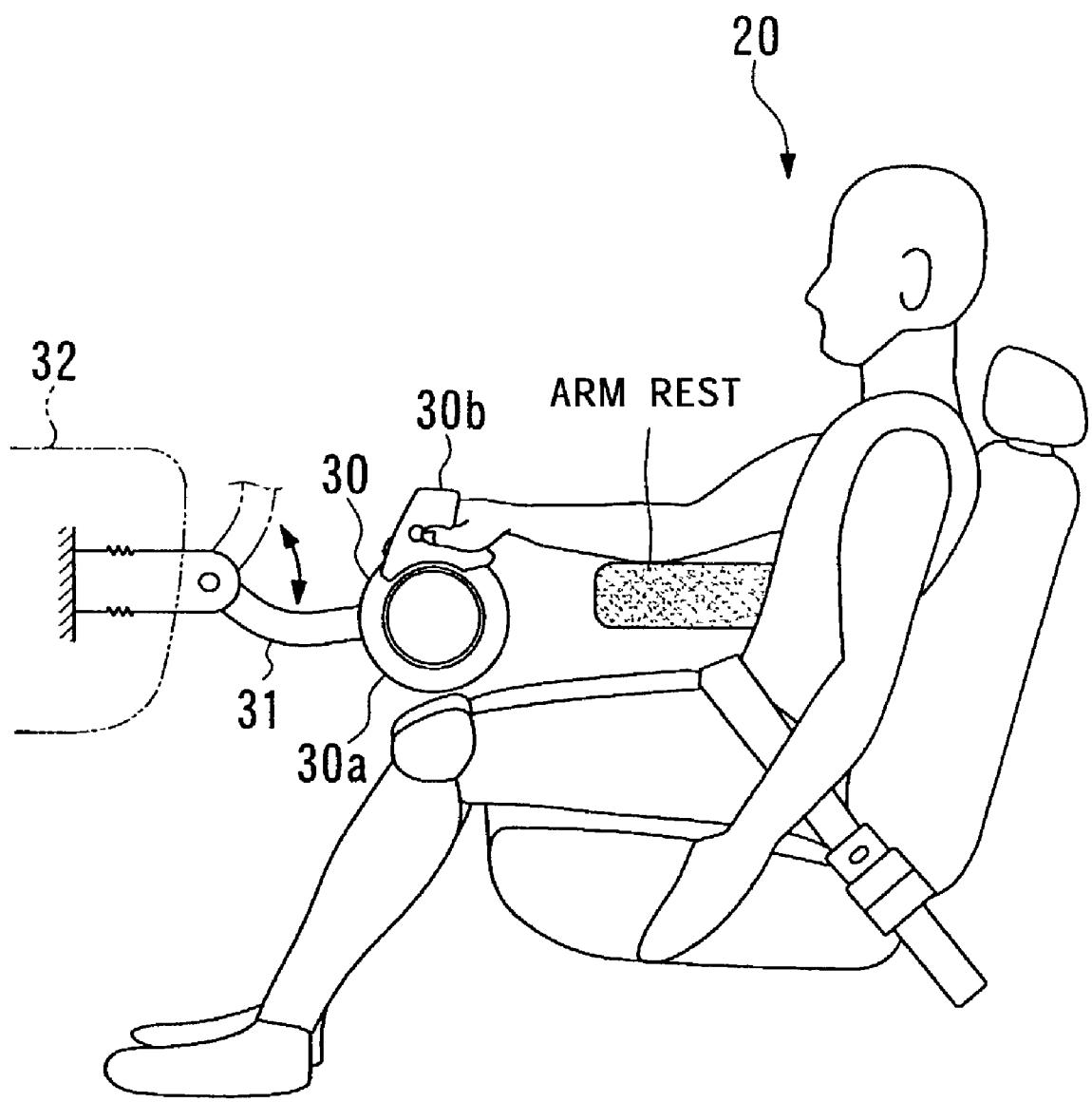
FIG. 7 illustrates a driver and a seat of a car equipped with a joy stick working as a steering device.

FIG. 7 illustrates the driver's seat and the surrounding portion of a vehicle equipped with the joy stick 30 functioning as the steering device 201 and the operation unit 202.

As shown, the joy stick 30, fixed on a support bar 31, is vertically pivotally supported with respect to an inner panel 32.

The joy stick 30 includes a fixed block 30a and a movable block 30b. The driver operates the vehicle by using the joystick 30 for setting the direction of movement, acceleration, deceleration and stopping the vehicle.

Figure 8A:
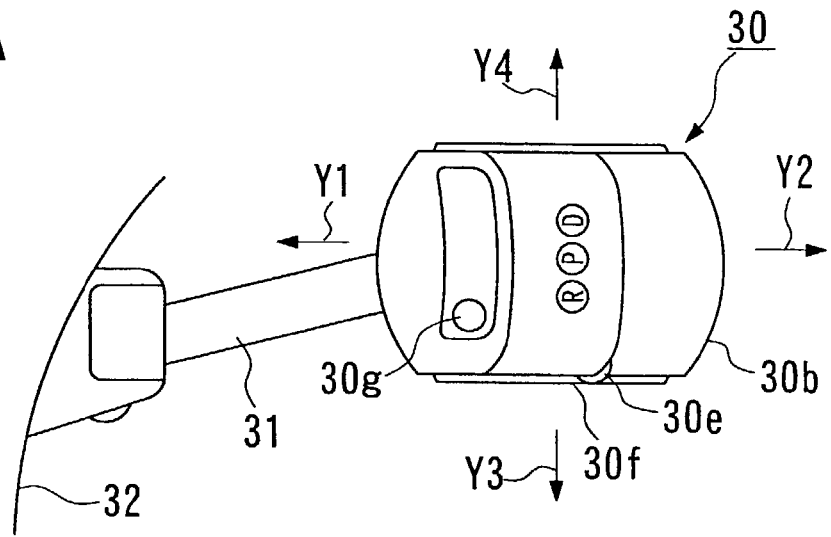
FIG. 8A is a plan view of the joy stick.
Figure 8B:
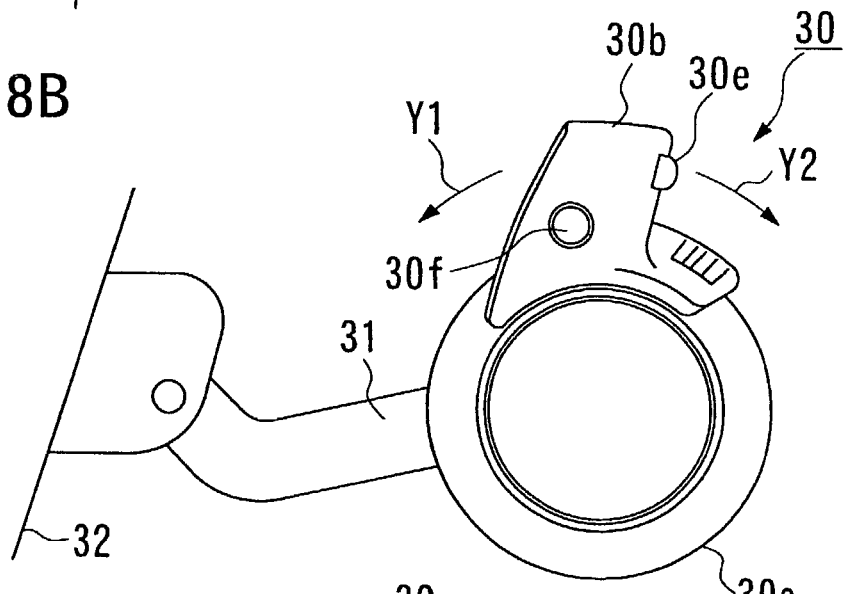
FIG. 8B is a side view of the joy stick.
Figure 8C:
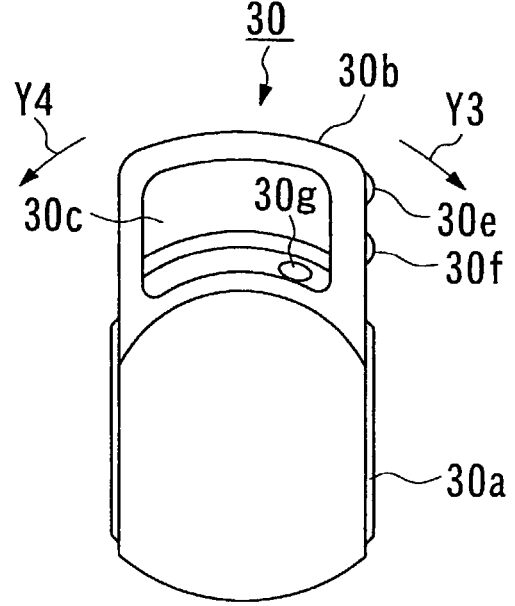
FIG. 8C is a front view of the joy stick.

FIGS. 8A–8C illustrate the construction of the joy stick 30. FIG. 8A is a plan view of the joy stick 30; FIG. 8B is a side view of the joy stick 30; and FIG. 8C is a front view of the joy stick 30. As shown, components identical to those described with reference to FIG. 7 are designated with the same reference numerals.

As shown, the joy stick 30 includes the fixed block 30a, fixed to the support bar 31 and having a wheel-like shape if viewed from side (see FIG. 7 and FIG. 8B), and the movable block 30b that is slidably supported around the fixed block 30a in four directions represented by the arrows Y1–Y4 upward, downward, to the left and to the right. The outer circumference of the fixed block 30a is partly an arc in a plane normal to the driver.

The arrow Y1 represents an upward direction; the arrow Y2 represents a downward direction; the arrow Y3 represents a leftward direction; and the arrow Y4 represents a rightward direction. Hereinafter, these directions are respectively referred to as the upward Y1 direction, the downward Y2 direction, the leftward Y3 direction, and the rightward Y4 direction.

Figure 9A:
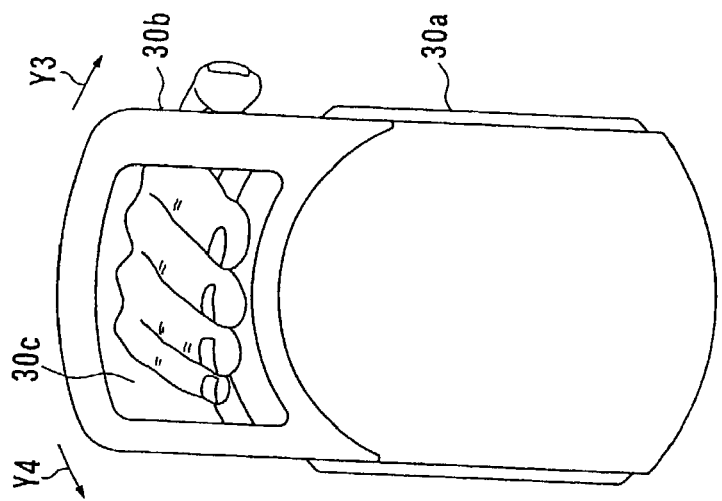
FIG. 9A is a plan view illustrating the joy stick which is held by the palm of the hand of the driver.
Figure 9B:
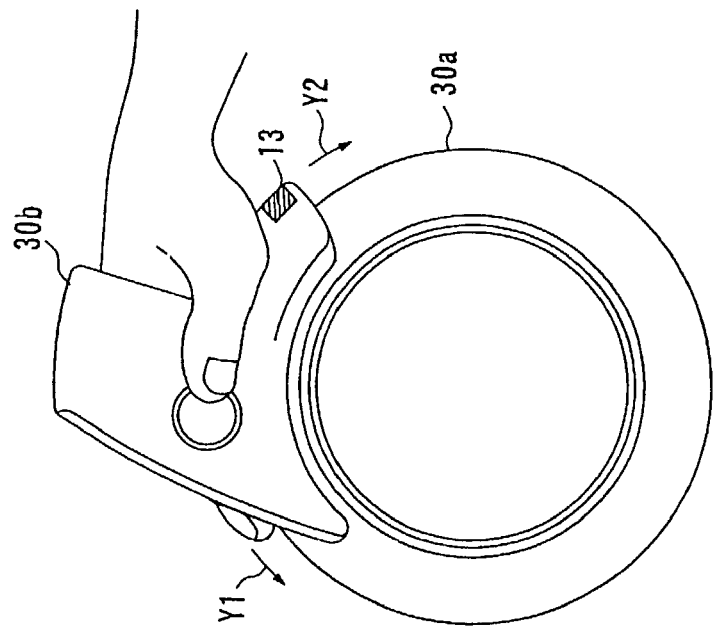
FIG. 9B is a side view of the joy stick.

FIG. 9A is a plan view illustrating the joy stick 30, which is held by the palm of the hand of the driver 20; FIG. 9B is a side view of the joy stick 30; and FIG. 9C is a front view of the joy stick 30.

Figure 9C:
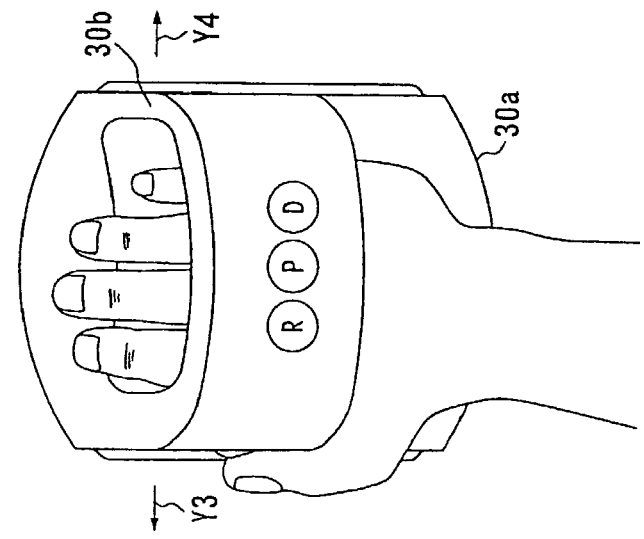
FIG. 9C is a front view of the joy stick.

Referring to FIGS. 9B and 9C, the movable block 30b includes an opening 30c, through which the driver 20 places the hand with the whole palm thereof holding the movable block 30b, and a drive button D, a parking button P, and a reverse button R arranged on the top surface of the movable block 30b (see FIG. 9A).

Referring to FIG. 8C, a turn signal switch 30e and a hold button 30f are arranged on the outer side wall of the movable block 30b, and a horn button 30g is arranged on the bottom surface of the opening 30c. These components are not shown in FIGS. 9A–9C.

The joy stick 30 thus constructed converts a displacement of the movable block 30b into electrical signals representing the direction of movement of the vehicle and the acceleration deceleration, and stopping of the vehicle. By appropriately adjusting the displacement of the movable block 30b, the joy stick 30 functions as the conventional steering wheel, the shift lever, etc.

To cause the vehicle to run forward or backward, to cause the vehicle to turn left or right, or to cause the vehicle to stop running, the driver 20 operates the joy stick 30 as described below.

When the driver 20 gets in the vehicle, the joy stick 30 is raised to an upward position. The driver 20 lowers the joy stick 30 to the operation position thereof. The driver 20 places the right hand into the opening 30c of the movable block 30b and holds the movable block 30b with the entire palm of the hand. The forearm may be planted on an arm rest.

To drive the vehicle forward, after starting the engine, the driver 20 presses his or her left hand against the drive button D and gradually shifts the movable block 30b in the backward Y2 direction. The vehicle gradually accelerates, running forwardly. When the vehicle reaches a predetermined speed, the driver 20 holds the movable block 30b for a constant speed cruising. When the vehicle cruises on an open road where acceleration and deceleration are frequently repeated, the movable block 30b must be frequently shifted forward and backward, and the movable block 30b is preferably held with the hand. When the vehicle runs on an expressway where the vehicle typically runs at a constant speed for a long period of time, the hold button 30f may be pressed for a constant running speed.

To run the vehicle backward, after starting the engine, the driver 20 presses the reverse button R and gradually shifts the movable block 30b in the backward Y2 direction. The vehicle gradually accelerates, running backwardly. When the vehicle reaches a predetermined speed, the driver 20 holds the movable block 30b with the hand. For example, when the vehicle reaches a desired place, the driver 20 shifts the movable block 30b in the forward Y1 direction for a halt.

Now, the driver 20 performs a right turn action. When the vehicle approaches a point of making a right turn, the driver 20 operates the turn signal switch 30e for a right turn with the thumb, then gradually places the movable block 30b to the standard position for deceleration, and shifts the movable block 30b in the rightward Y4 direction. When the vehicle completes a right turn, the driver 20 shifts the movable block 30b in the leftward Y3 direction for straight running. When the movable block 30b is shifted in the leftward Y3 direction, the turn signal switch 30e automatically returns to a neutral position with neither right turn nor left turn indicating.

A left turn action is now discussed. When the vehicle approaches a point of making a left turn, the driver 20 gradually returns the movable block 30b to the standard position for deceleration. After pressing the turn signal switch 30e with the thumb, the driver 20 gradually places the movable block 30b to the standard position for deceleration and shifts the movable block 30b in the leftward Y3 direction. When the vehicle completes a left turn, the driver 20 shifts the movable block 30*b* in the right Y4 direction for straight running. When the movable block 30*b* is shifted in the right Y4 direction, the turn signal switch 30*e* automatically returns to a neutral position with neither right turn nor left turn indicating.

A stop action is now discussed. When the driver 20 gradually shifts the movable block 30*b* to the standard position with the vehicle running, the vehicle gradually decelerates. With the joy stick 30*b* gradually shifting in the forward Y direction, the vehicles comes to a halt. To brake the vehicle suddenly in the middle of running, the driver 20 quickly shifts the movable block 30*b* in the forward Y1 direction. The vehicle comes to a sudden halt.

Now, the driver 20 gets off the vehicle. After driving, the joy stick 30 remains lowered to the operation position. The driver 20 moves his or her hand from within the opening 30*c* and then raises the movable block 30*b* to a position where the movable block 30*b* is not in the way of the driver 20 who is getting off the vehicle.

Figure 10:
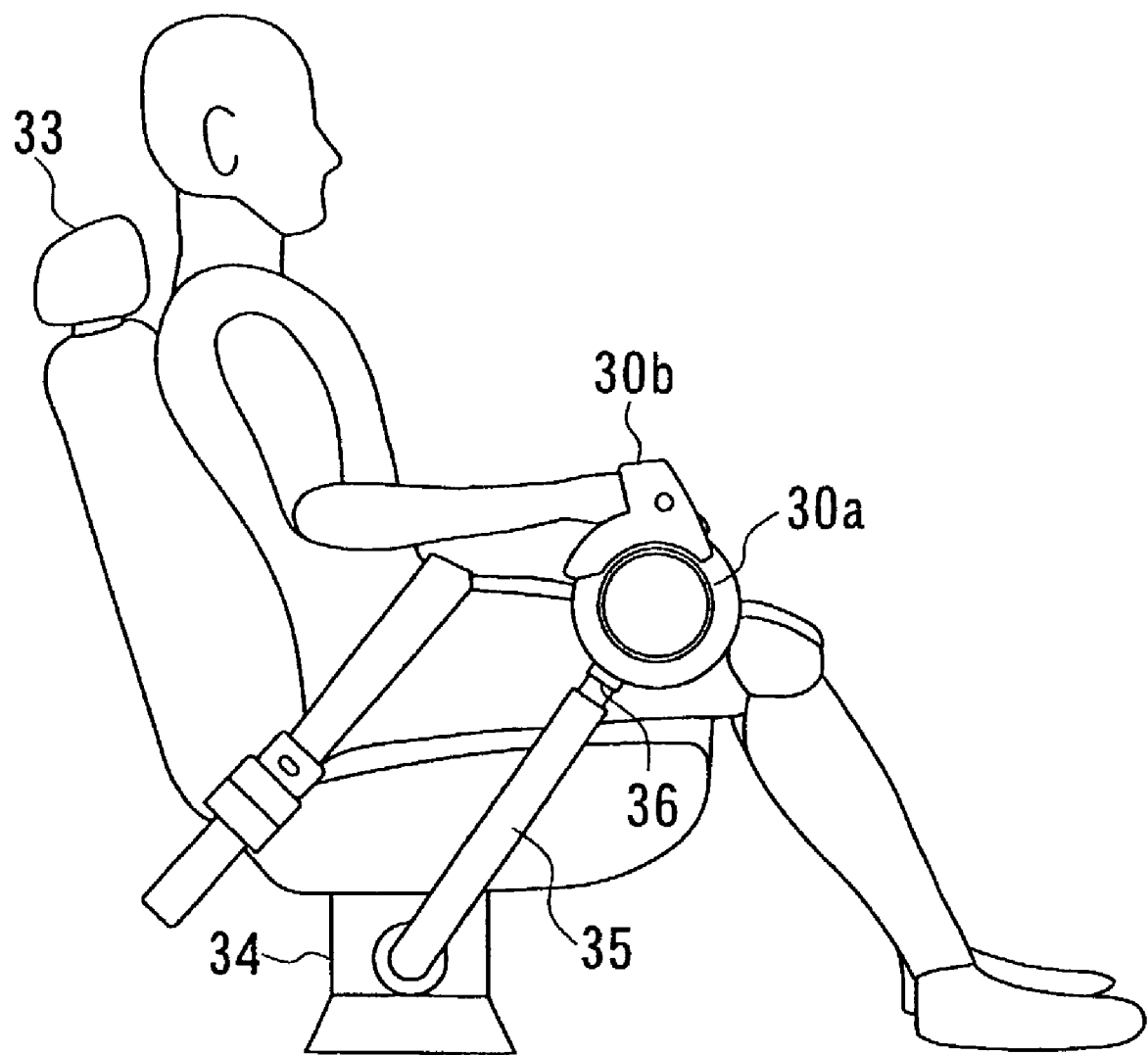
FIG. 10 illustrates the joy stick installed on the driver's seat.

FIG. 7 illustrates the joy stick 30 that is mounted on the inner panel 32 of the vehicle. The mounting position of the joy stick 30 is not limited to the inner panel 32. Referring to FIG. 10, a first support bar 35 is fixed to a seat mount 34 that supports a driver's seat 33. A second support bar 36 is supported by the first support bar 35 in a retractable fashion. The joy stick 30 is mounted on the second support bar 36.

The construction of the vehicle and the joy stick 30 functioning as the steering device 201 forming a part of the vehicle have been discussed. The mounting position of the authenticator 10, namely, the venous pattern detector 13 in the joy stick 30, is discussed below.

FIG. 9B illustrates the mounting position of the venous pattern detector 13 in the joy stick 30. When the joy stick 30 is used as the authenticator 10, the venous pattern in and near the wrist of the driver 20 is detected as shown in FIGS. 2A–2C and FIG. 9B. As already discussed, the joy stick 30 forms a part of the vehicle.

When the driver 20 operates the joy stick 30, the driver 20 puts the hand into the opening 30*c* of the movable block 30*b* of the joy stick 30 and holds the movable block 30*b* with the entire palm of the hand. The position of the hand is then a home position of the driver 20 with respect to the joy stick 30. In example 1, the venous pattern detector 13 is arranged near the back end of the movable block 30*b*. The home position is the position the driver 20 naturally takes when operating the joy stick 30. Using the home position for authentication eliminates the need for a particular action of the driver 20 for authentication. The venous pattern detector 13 is mounted so that the wrist and the forearm of the driver 20 face the venous pattern detector 13 in the home position. The venous pattern of the driver 20 is effectively captured.

When the driver 20 uses the joy stick 30 shown in FIG. 9B, the driver 20 places the palm on the home position. The venous pattern detector 13 looks toward the wrist of the driver 20. Specifically, the venous pattern detector 13 faces an enclosed area designated (a). When the light emitter 16 in the venous pattern detector 13 emits an infrared light beam in that state, the light detector 17 detects light reflected from the regions designated (b) and (c). In this way, the venous pattern in the regions (b) and (c) is detected.

Figure 11:
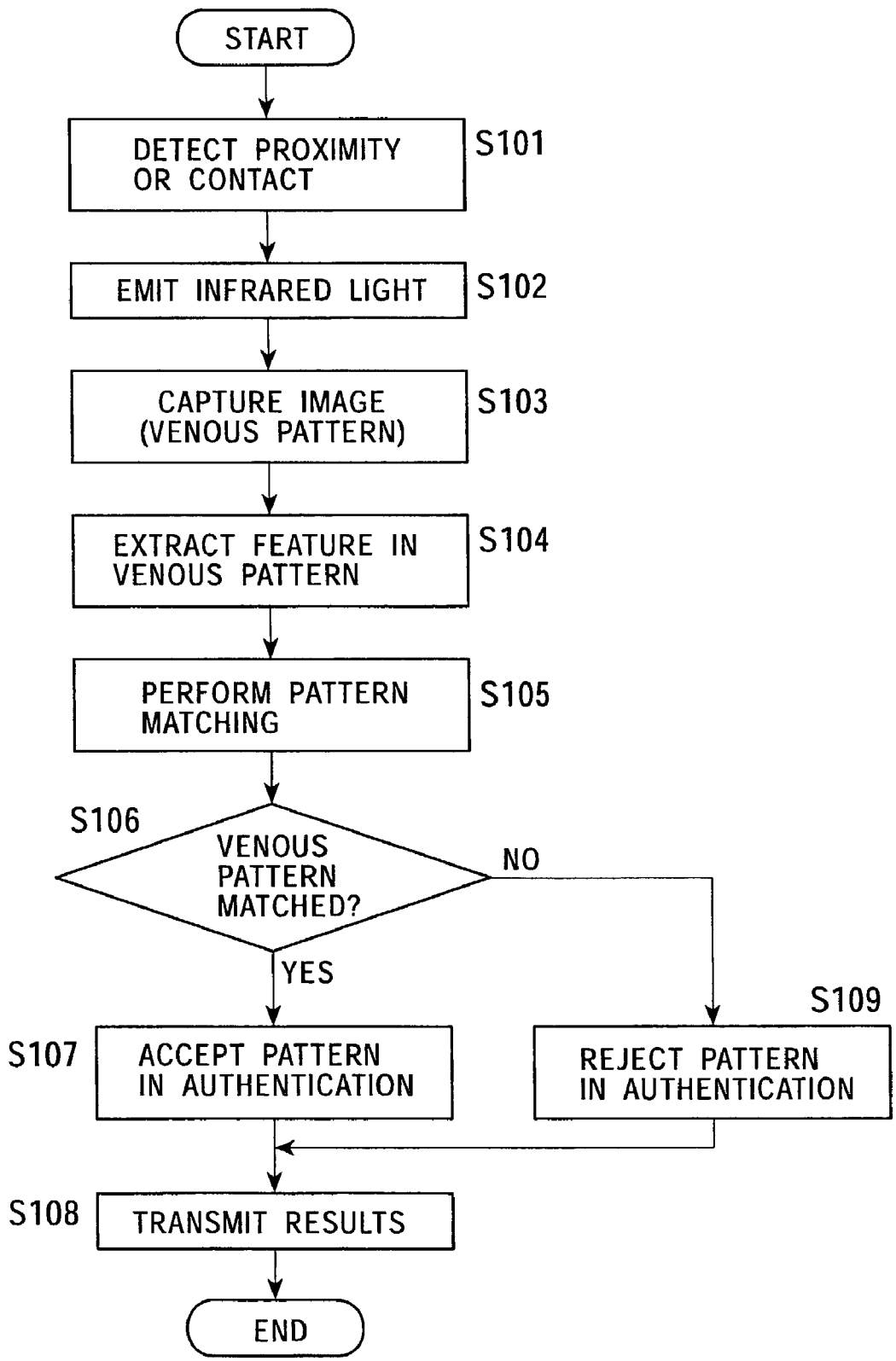
FIG. 11 is a flow diagram of a process for detecting the venous pattern through the authenticator.

FIG. 11 is a flow diagram of a process for detecting the venous pattern through the authenticator 10. This process is carried out with the driver 20 in contact with or in proximity with the authenticator 10.

The sensor 11 continuously monitors whether the driver 20 is in contact with or in proximity with the authenticator 10 (or every predetermined intervals). The sensor 11 now detects that the driver 20 touches or moves close to the authenticator 10 (step S101). In response, the light emitter 16 emits an infrared light beam at a predetermined intensity level to the wrist (or the palm of the hand) of the driver 20 (step S102). The timing and level of light emission of the light emitter 16 are controlled by the authentication determining unit 14.

When the infrared light beam emitted from the driver 20 in step S102 is reflected from the surface of the skin of the driver 20, the light detector 17 detects the reflected light. Upon detecting the reflected light, the light detector 17 captures the image of the venous pattern of the driver 20 in the regions (b) and (c) as shown in FIGS. 2A–2C (step S103).

The image of the venous pattern of the driver 20 captured in step S103 is then sent to the authentication determining unit 14. In step S104, the authentication determining unit 14 extracts a feature of the venous pattern from the image of the captured venous pattern in accordance with the a predetermined logic. Specifically, a difference in the light reflected from the infrared irradiated area of the driver 20 due to a difference in the tissue under the skin (namely, a difference in absorptivity to the infrared light) is optically analyzed (step S104).

The featured-extracted venous pattern is cross-checked with the venous pattern stored in the registered data storage unit 12 (step S105). It is determined in step S106 whether the two patterns match each other. When it is determined that the two patterns match each other, the driver is successfully authenticated (step S107), and the algorithm proceeds to step S108. When a plurality of drivers are registered, in other words, a plurality of venous patterns are stored in the registered data storage unit 12, the identification of the driver 20 also is performed in step S107.

When the feature-extracted venous pattern fails to match the venous pattern stored in the registered data storage unit 12, the driver 20 is rejected in authentication in step S109, and the algorithm proceeds to step S108. The transmitter 15 outputs the authentication determination result of the authentication determining unit 14 (authentication result), namely, rejection of the venous pattern, at an appropriate timing (step S108). The driver 20 easily learns that the driver 20 himself or herself is rejected in the authentication process.

When it is determined in step S107 that the driver 20 is authenticated, the transmitter 15 outputs the authentication determination result of the authentication determining unit 14 at an appropriate timing (step S108).

As already described, the steering device 201 and the operation unit 202 forms a part of the vehicle. The authentication determination result is thus output to the CPU 101 in the control block 100 of the vehicle at an appropriate timing. In response to the authentication determination result, driver 20 is permitted access to the engine control system. The authentication determination result may be used to personalize the setting of the control block 100. For example, when the venous patterns of a plurality of drivers 20 are registered in the registered data storage unit 12, the setting of the suspension device may be set to meet the requirements of the driver 20. In accordance with the authentication determination result, the position and height of the driver's seat may be set to the registered setting of each driver 20.

The flow of the detection of the venous pattern performed by the authenticator 10 has been discussed. The flow holds true in the following example.

Figure 12:
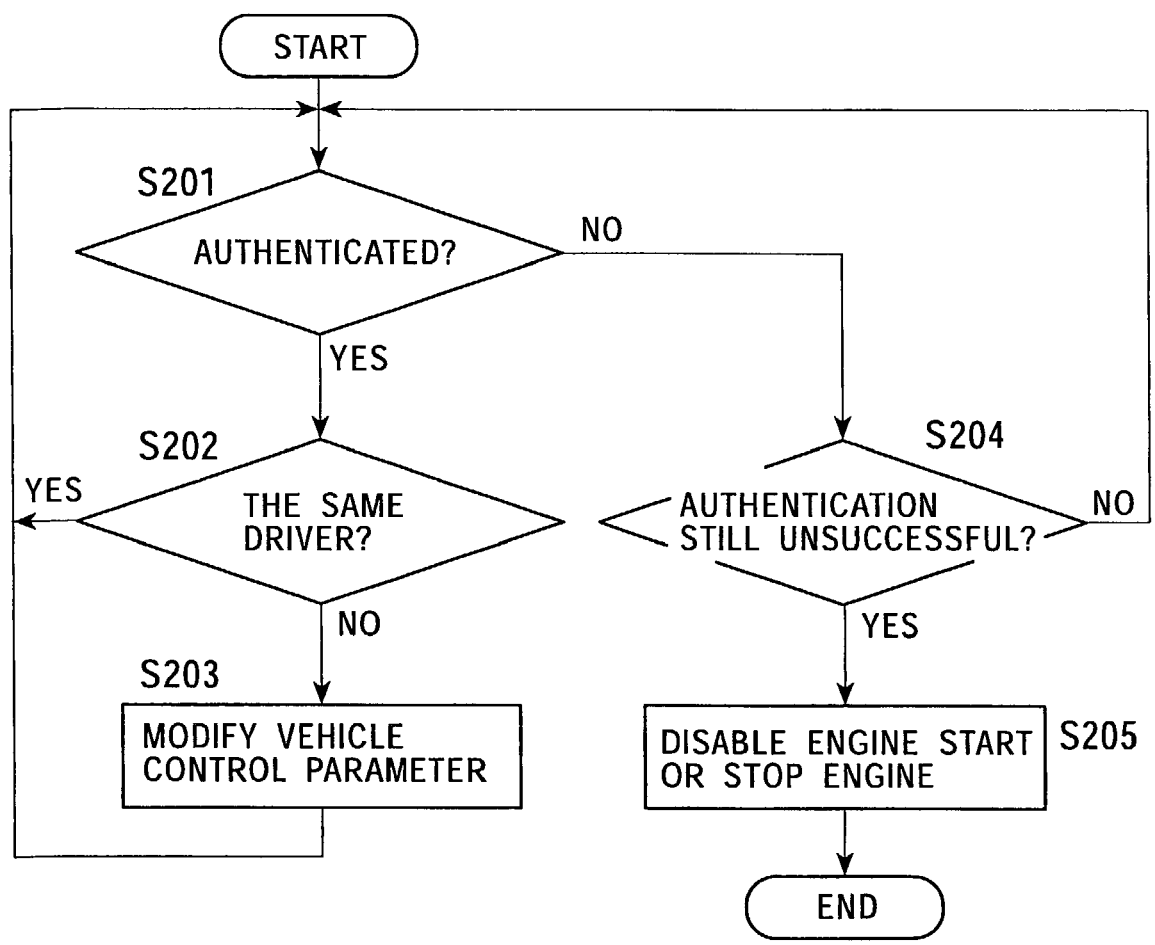
FIG. 12 is a flow diagram of a process that is performed when a CPU references a preceding authentication result.

In step S108 illustrated in FIG. 11, the authentication determination result is sent to the CPU 101. The CPU 101 stores the authentication determination result in the memory 102 for a predetermined cycle or a predetermined duration of time. FIG. 12 illustrates the flow of the process of the CPU 101 which references a previous authentication determination result.

In step S201, the CPU 101 determines whether or not the authentication determination result sent from the transmitter 15 is a successful authentication. If it is determined that the result is a successful authentication, the algorithm proceeds to step S202.

In step S202, the CPU 101 references a previous authentication determination result, thereby determining whether the driver 20 who is currently successfully authenticated is the same driver 20 who has been authenticated. When it is determined that the driver 20 currently authenticated is the same person, the algorithm loops to step S201.

If it is determined in step S202 that the driver 20 currently authenticated is not the same driver 20 who has been authenticated, the algorithm proceeds to step S203. In step S203, the CPU 101 reads a vehicle control parameter on a per driver basis corresponding to the venous pattern of the driver 20 currently detected from the control parameter memory block 102a and sends the control parameter to the controller 103. Upon receiving the control parameter, the controller 103 modifies the vehicle control parameter based on the control parameters on a per driver basis and then loops to step S201.

If it is determined in step S201 that the driver 20 is not authenticated, the algorithm proceeds to step S204. In step S204, the CPU 101 references a previous authentication determination result and then determines whether the authentication still remains unsuccessful. If it is determined in step S204 that the authentication does not remain unsuccessful, the algorithm loops to step S201.

If it is determined in step S204 that the authentication is repeatedly unsuccessful by predetermined cycles, the algorithm proceeds to step S205. If the number of unsuccessful authentication cycles (continuous unsuccessful authentication time) exceeds a predetermined threshold in the determination in step S204, the algorithm proceeds to step S205.

In step S205, the controller 103 disables the engine from starting or stops the engine if the engine is running. The control process of step S205 is not limited to the stopping of the engine, but may also inhibit clutching, unlock the steering device 201 and the operation unit 202, or blow the horn.

The flow of the process of the CPU 101 referencing the previous authentication determination result has been discussed. The flow may be applied to the following example.

EXAMPLE 2

Figure 13B:
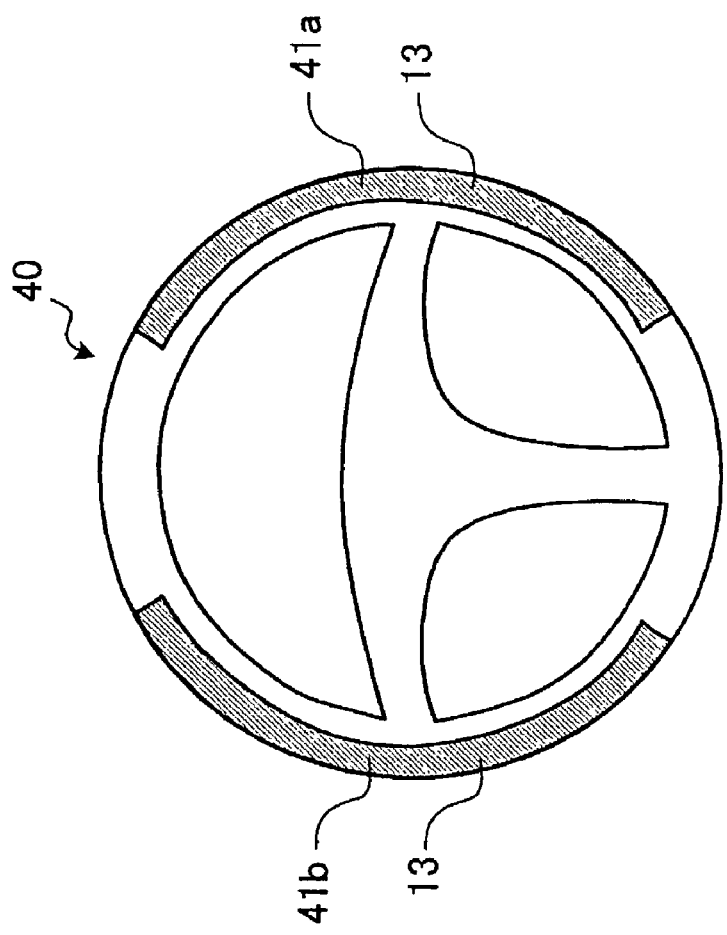
FIGS. 13A and 13B illustrate the venous pattern detector when the authenticator is mounted on a steering wheel.
Figure 13A:
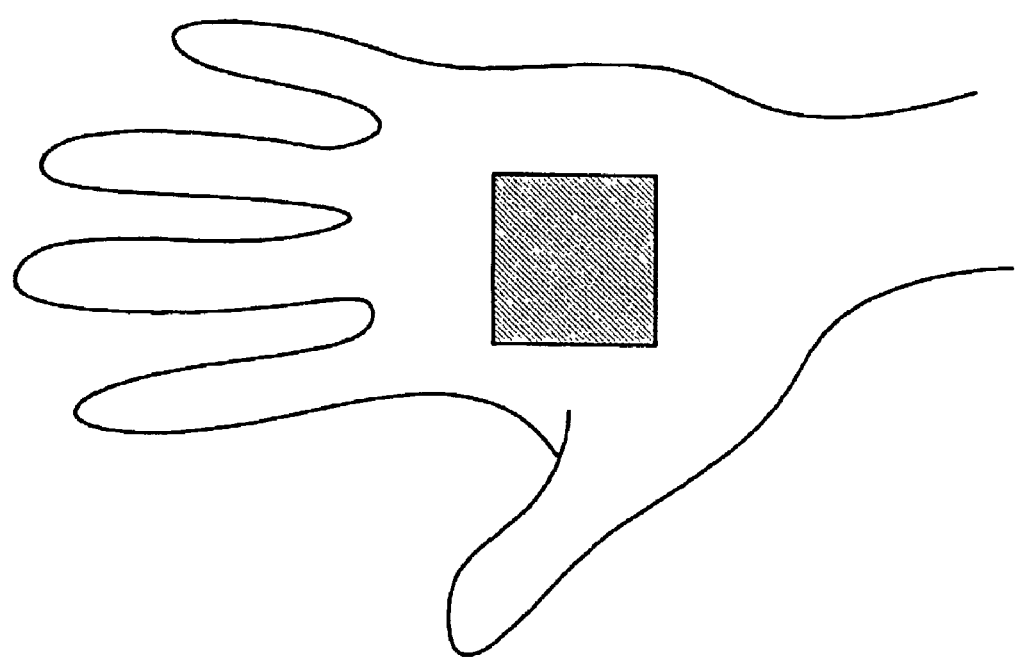

FIGS. 13A and 13B illustrate the venous pattern detector 13 that is mounted on a steering wheel 40 (a steering device, an operation device, or operation means) as the steering device 201 of the vehicle. When the steering wheel 40 is used as an authenticator 10, the venous pattern of the palm of the hand (a shadowed square) of the driver 20 is detected as shown in FIG. 13A. As is known, the steering wheel 40 is mounted as the steering device 201 in front of the driver's seat. The steering wheel 40 constitutes the vehicle. When the driver 20 sits on the driver's seat, the driver 20 typically holds a right arc portion 41a and a left arc portion 41b of the steering wheel 40, as shown in FIG. 13B. The position of each hand is the home position of the driver 20 to the steering wheel 40. In example 2, the venous pattern detector 13 is placed on each of the right arc portion 41a and the left arc portion 41b. The home position is a position the driver 20 naturally takes when operating the steering wheel 40. Using the home position for authentication eliminates the need for a particular action of the driver 20 for authentication. The venous pattern detector 13 is mounted so that the palm of the hand of the driver 20 faces the venous pattern detector 13 in the home position. The venous pattern of the driver 20 is effectively captured.

The venous pattern detector 13 detects the venous pattern in the palm of the hand or the wrist of the driver 20 for authentication in the above-referenced authenticator 10, the steering device 201 to which the authenticator 10 is incorporated, or the vehicle in which the authenticator 10 is incorporated. Personal authentication is thus performed in the same manner as authentication using a fingerprint or a iris. Since the venous pattern is substantially coarse in comparison with the fingerprint and the iris, the pattern resolution required of the authentication determining unit 14 in pattern matching is low. The venous pattern detector 13 including the light emitter 16 and the light detector 17 has a construction simpler than that of a conventional fingerprint detector. A low-cost authenticator 10 works.

The venous pattern detector 13 is mounted based on a position the driver 20 naturally takes when the steering device 201 having the authenticator 10 is operated, in other words, based on the home position to the steering device 201. This arrangement eliminates the need for an particular action of the driver 20 for authentication. The venous pattern of the driver 20 is automatically checked. The ease of use is substantially promoted in this arrangement.

In the above embodiments, the venous pattern detector 13 includes the linear light emitter 16 and the light detectors 17 on both sides thereof. The present invention is not limited to this arrangement. Alternatively, the venous pattern detector 13 may have a dot-matrix structure.

In the above embodiments, the joy stick 30 including the fixed block 30a and the movable block 30b serves the function of the steering device 201 and the operation unit 202. A typically available joy stick may be used instead. The authenticator 10 may be mounted on a shift lever rather than on the steering wheel 40.

The infrared light beam is used as a means for detecting the venous pattern in the above embodiments. The present invention is not limited to the infrared light beam. Other means may be used.

For example, a plurality of capacitance sensors arranged in a dot matrix configuration is mounted on a user interface or an object to be operated. The network of the vessels is detected from a change in capacitance due to the flow of blood.

An ultrasonic beam projector may be mounted on a user interface or an object to be operated. The ultrasonic beam projector directs an ultrasonic beam to the inside of the forearm of the driver 20. A beam reflected from a blood cell, which is a moving reflector, is then detected by a detector. The frequency of the reflected beam (a reception frequency) is changed from the transmission frequency of the ultrasonic beam emitted from the ultrasonic beam projector in proportion to the speed of the blood cell owing to the Doppler shift. The distribution of the speed of the blood based on the Doppler shift results in a blood vessel running pattern.

A plurality of magnetic heads as magnetic field generator means may be substituted for the plurality of lamps 16a of the light emitter 16. The magnetic heads in the light emitter 16 generate a magnetic field. A detector is arranged to detect an electrical change in voltage or current within the area of the magnetic field. Specifically, when the magnetic field generator means generates the magnetic field, an induced electromotive force occurs when blood containing a great deal of charged particles flows perpendicular to the magnetic field. Let B represent the flux density of the magnetic field, d represent the diameter of the vessel, and v represent the velocity of the blood, and the induced electromotive force e is determined from the following equation.

$$e=Bdv$$

Given a constant flux density B and a constant vessel diameter d, the velocity v of the blood flow is measured if the induced electromotive force e is detected. The distribution of the velocity of the blood flow thus detected determines the presence of the blood vessel. The distribution pattern of the vessel is thus obtained.

A blood flow rate Q is determined based on the measured velocity v from the following equation.

$$Q=\pi(d/2)^2 V$$

Two excitation methods for generating the magnetic field are available, namely, a DC method and an AC method. The induced electromotive force e is weak, and the DC method is subject to noise and drift of an amplifier. The AC method using a sinusoidal wave or a rectangular wave is preferable.

The authenticator 10 of the above embodiments detects the venous pattern in or close to the wrist or the palm of the hand of the driver 20. A combination of the wrist and the palm of the hand is perfectly acceptable. In the joy stick 30 illustrated in FIG. 9B, the venous pattern detector 13 for detecting the venous pattern of the wrist is arranged on the back end of the movable block 30b. Another joy stick 30 for detecting the venous pattern in the palm of the hand may be arranged on the opening 30c at a location facing the palm of the hand of the driver 20. Alternatively, the venous pattern detector 13 may be arranged to detect the venous pattern of the palm of the hand only.

The above embodiments may be partly changed, combined, an modified without departing from the scope of the present invention.

In accordance with the present invention, the system of the vehicle is simplified, and the driver enjoys the ease of use of the vehicle.

What is claimed is:

1. A steering device operated by a driver when the driver drives a vehicle, comprising:

an identification information acquisition unit, which automatically acquires identification information of the driver when the driver takes a home position for operating the steering device without need for a particular action of the driver for authorizing acquisition of identification information, mounted in a position at which an inside of a forearm of the driver, leading to the palm of a hand of the driver, faces when the driver assumes the home position to operate the steering device so that the identification acquisition unit detects the venous pattern of the inside of the forearm of the hand and acquires the venous pattern as the identification information, movable means shaped to receive the palm of the hand of the driver for gripping means so that the displacement of the movable means so that said steering device converts a displacement of said steering device to an electrical signal representative of said identification information;

and an identification information output unit for outputting the identification information.

2. A steering device according to claim 1, wherein the identification information acquisition unit detects the running pattern of blood vessels and acquires the blood vessel running pattern as the identification information.

3. A steering device according to claim 2, wherein the identification information acquisition unit comprises an infrared emitter for emitting an infrared light beam, and an infrared detector for detecting infrared light reflected in response to the infrared light beam emitted from the infrared emitter.

4. A steering device according to claim 1, wherein the identification information acquisition unit is mounted in a position toward which the wrist or the palm of the hand of the driver faces when the driver assumes the home position to operate the steering device.

5. A steering device according to claim 1, wherein the identification information acquisition unit automatically acquires the identification information in a non-contact state thereof with the driver without need for a particular action of the driver for authorizing acquisition of said identification information.

6. A method of authenticating a driver, comprising the steps of:

automatically acquiring, as identification information of the driver, the running pattern of a venous pattern of blood vessels of the inside of a forearm of the hand of the driver based on infrared light that is reflected from the inside of the forearm of the driver when an infrared light beam is directed to the inside of the forearm of the driver who assumes a home position to operate an operation device of a vehicle, without need for a particular action of the driver for authorizing acquisition of identification information;

providing movable means shaped to receive the palm of the hand of the driver for gripping means so that the displacement of the movable means is an operational amount for producing an electrical signal related to said identification information, and authenticating the driver based on the identification information.

7. A method according to claim 6, further comprising the step of performing a particular process on a per driver basis in response to the result of the authentication.

8. A vehicle comprising:

a steering device which receives an operation input by a driver to convert an operation amount into an electrical signal, identification information acquisition means which is mounted on the steering device, at a position at which an inside of a forearm of the driver, leading to the palm of a hand of the driver, faces when the driver assumes a home position to provide the operation input to said steering device, and, as identification information of the driver, detects a venous pattern of blood vessels of the inside of a forearm of the hand of the driver based on infrared light that is reflected from the forearm of the hand of the driver when an infrared light beam is directed thereto, without a need for a particular action of the driver for authorizing obtaining said identification information, movable means shaped to receive the palm of the hand of the driver for gripping means so that the displacement of the movable means is operational amount, and authenticating means for authenticating the driver based on the identification information.

9. A vehicle according to claim 8, further comprising processor means for performing a particular process on a per driver basis in response to the result of the authentication provided by the authenticating means.

10. A vehicle according to claim 8, wherein the operation means is a steering device which converts the operational amount into an electrical signal, further including fixed means mounted close to the position of operation, and movable means shaped to receive the palm of the hand of the driver for gripping means so that the displacement of the movable means is the operational amount.

* * * * *